Figure 6:
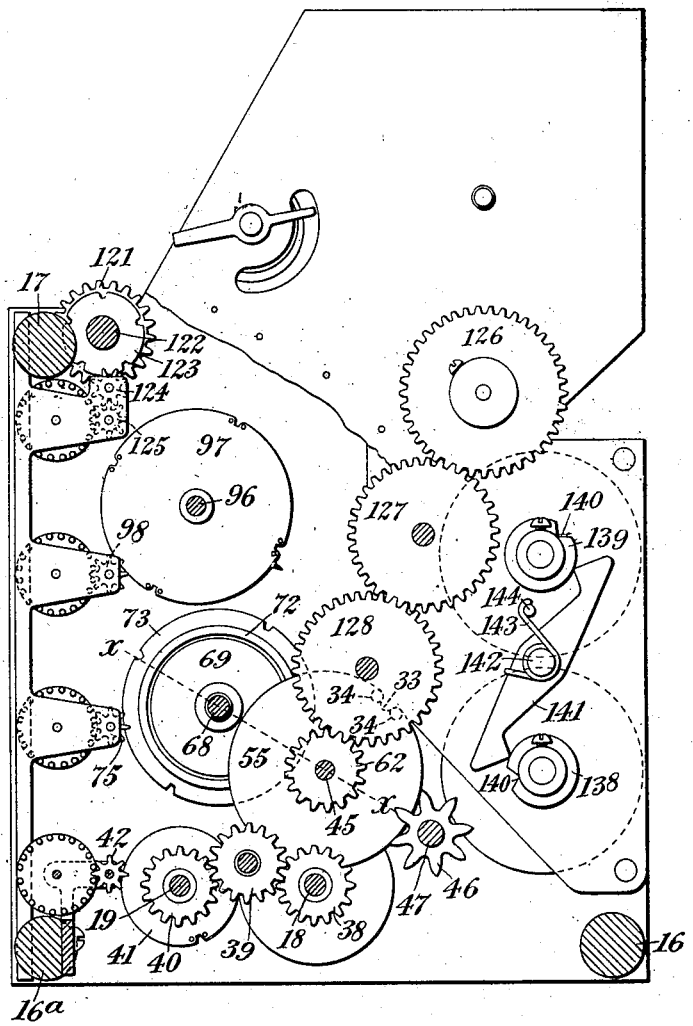

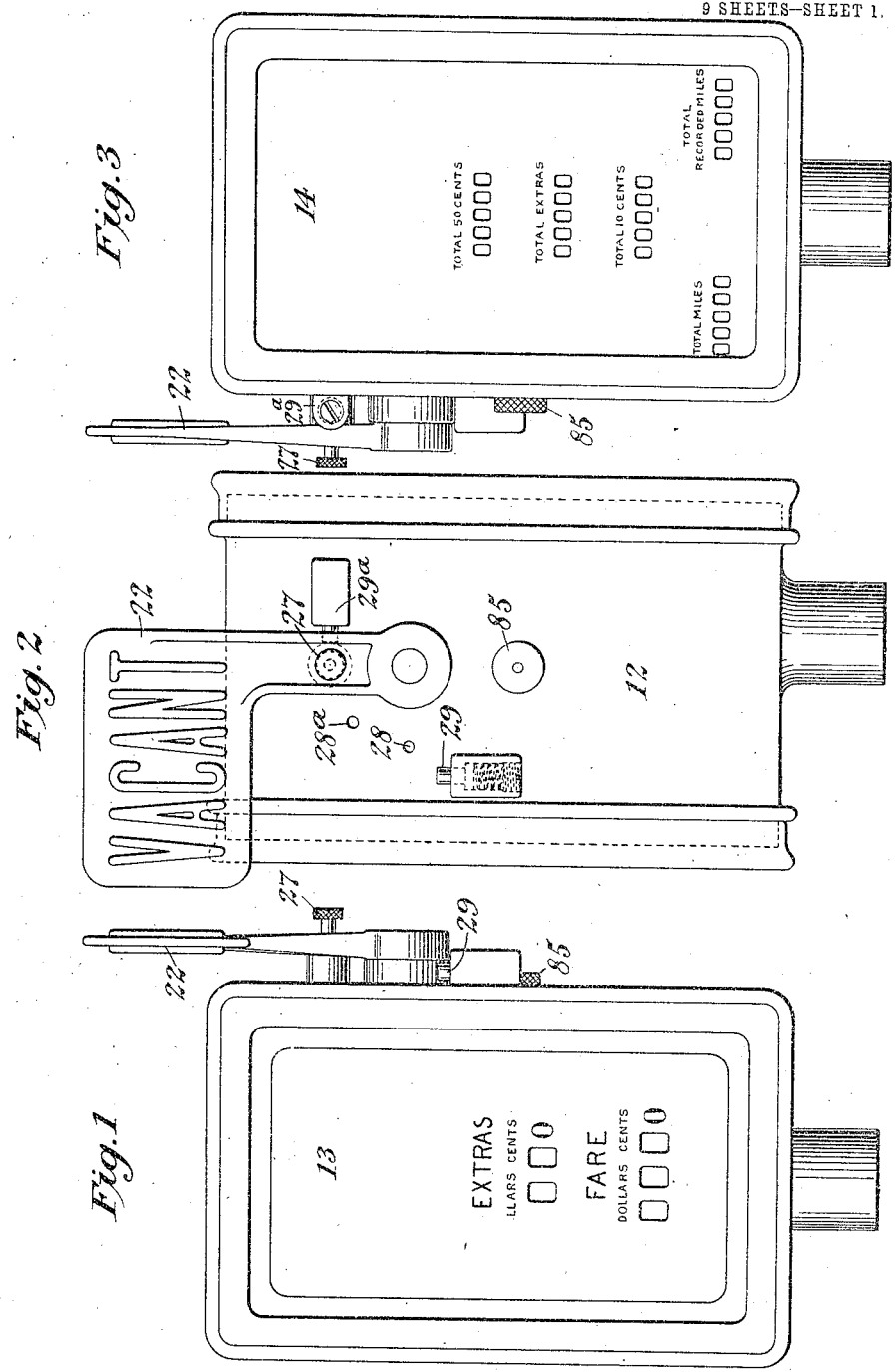

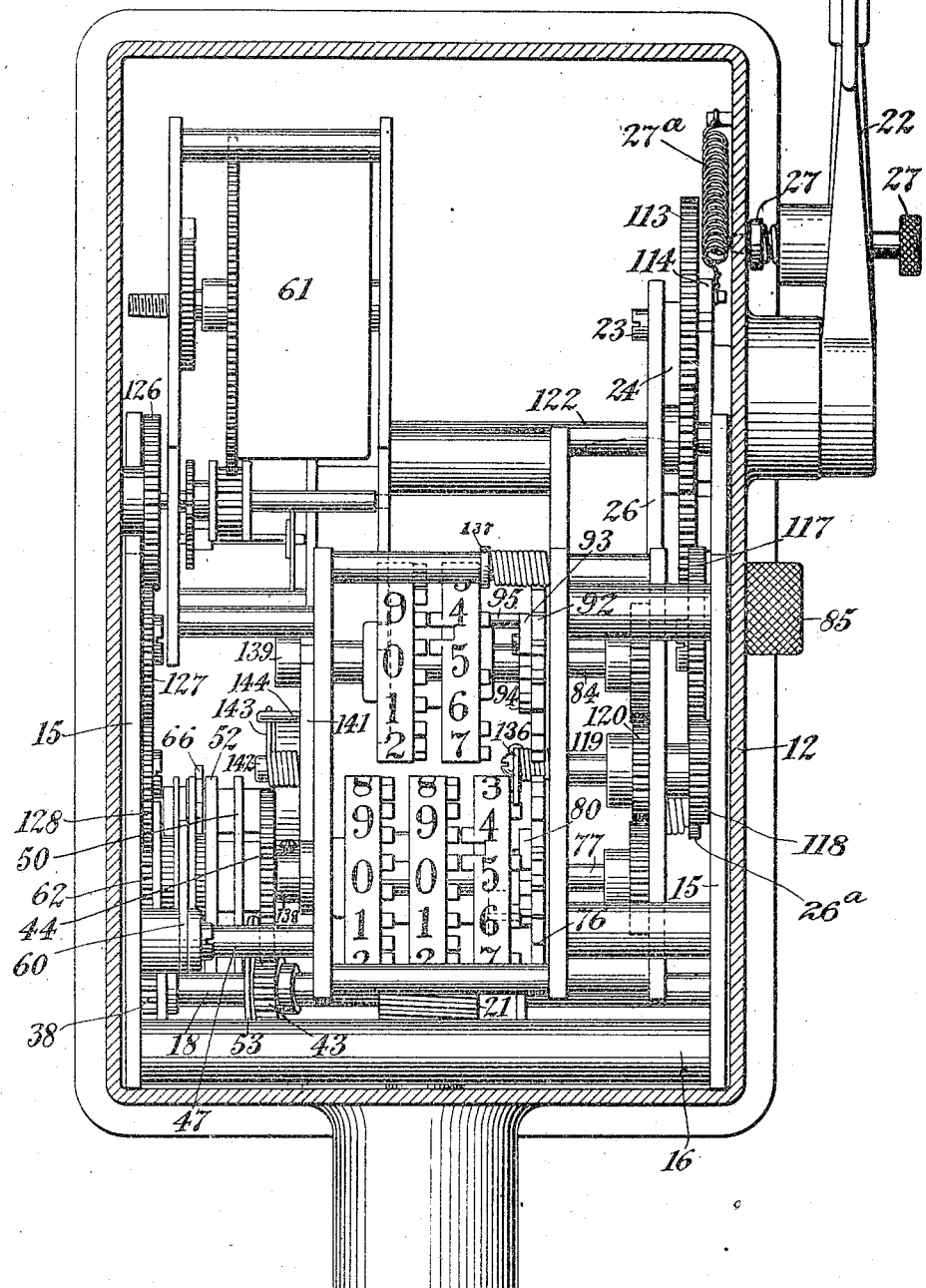

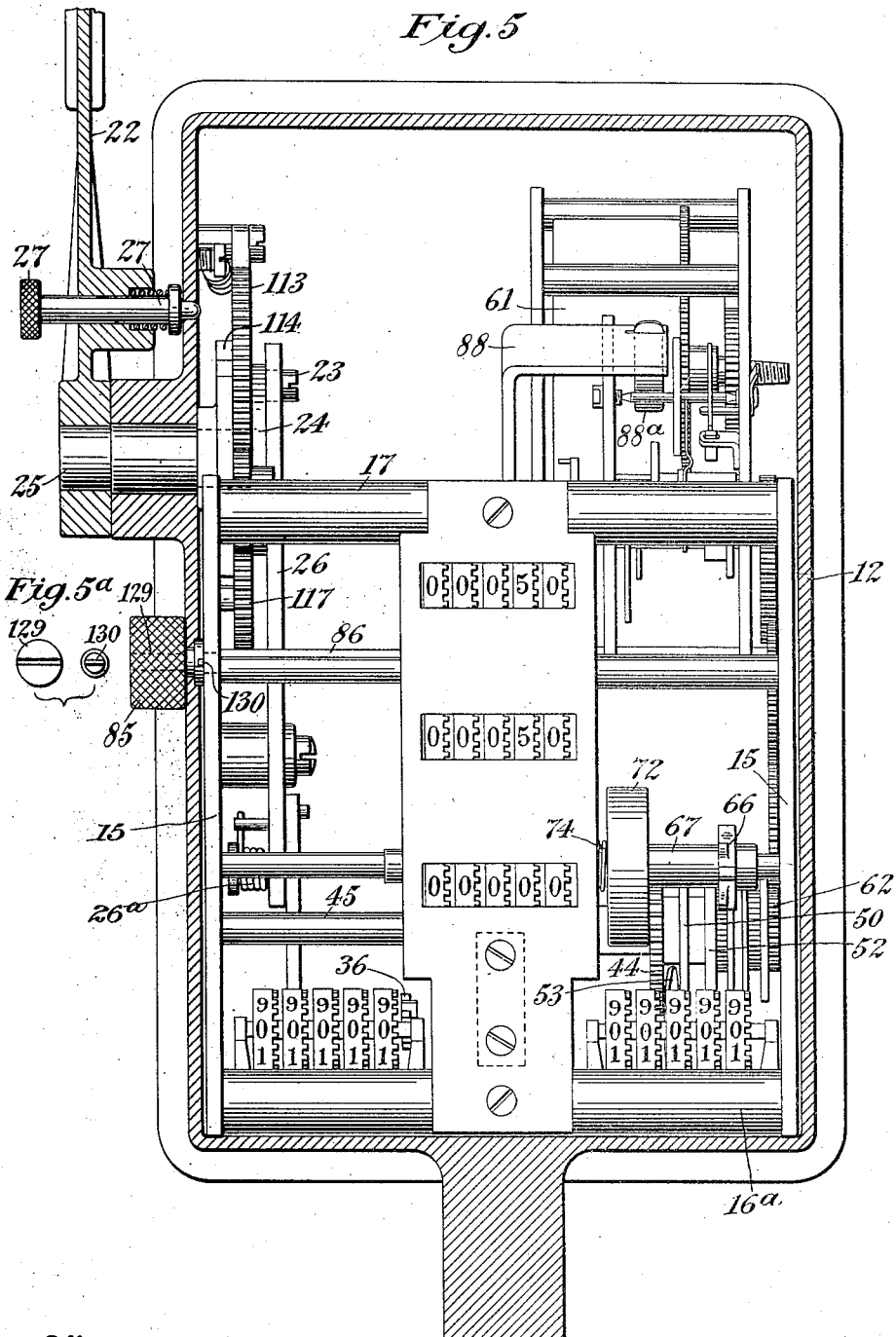

B. VOLKMAR.
FARE RECORDING REGISTER.
APPLICATION FILED OCT. 9, 1909.

1,053,252.

Patented Feb. 18, 1913.
9 SHEETS—SHEET 4.

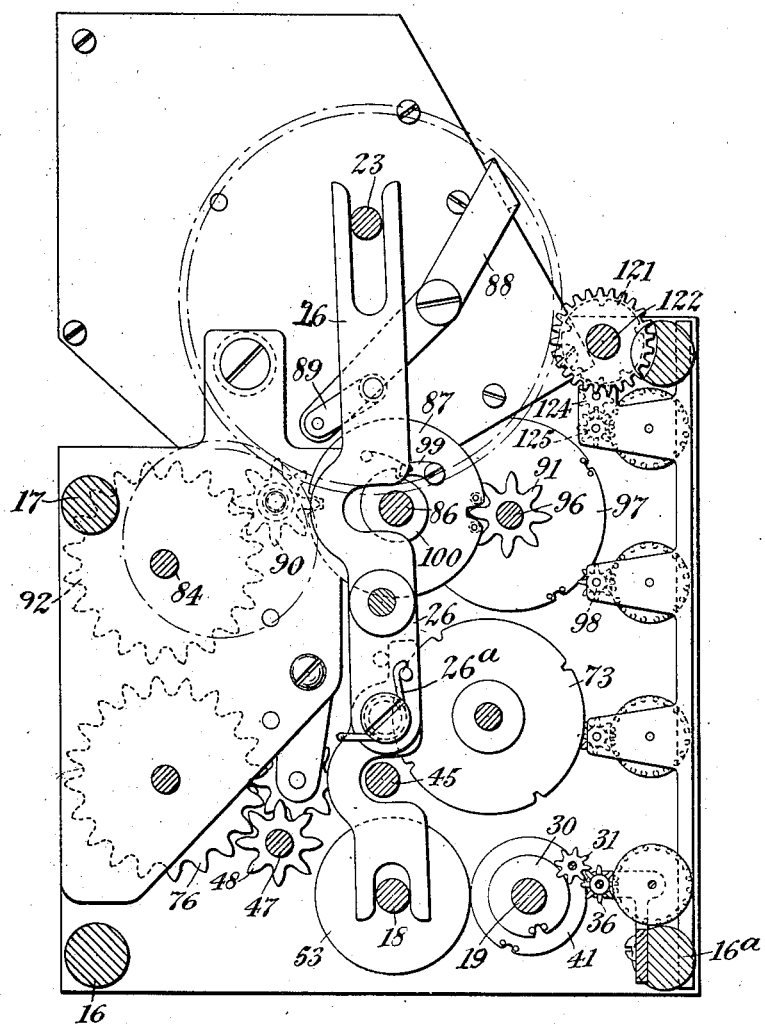

B. VOLKMAR.
FARE RECORDING REGISTER.
APPLICATION FILED OCT. 9, 1909.
1,053,252.
Patented Feb. 18, 1913.
9 SHEETS—SHEET 6.
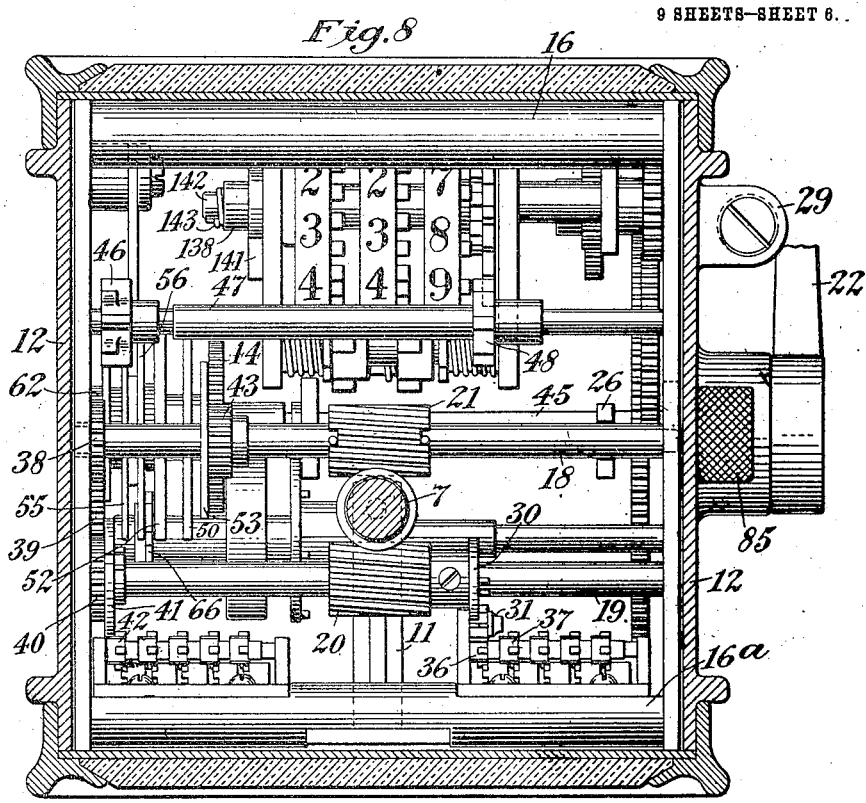
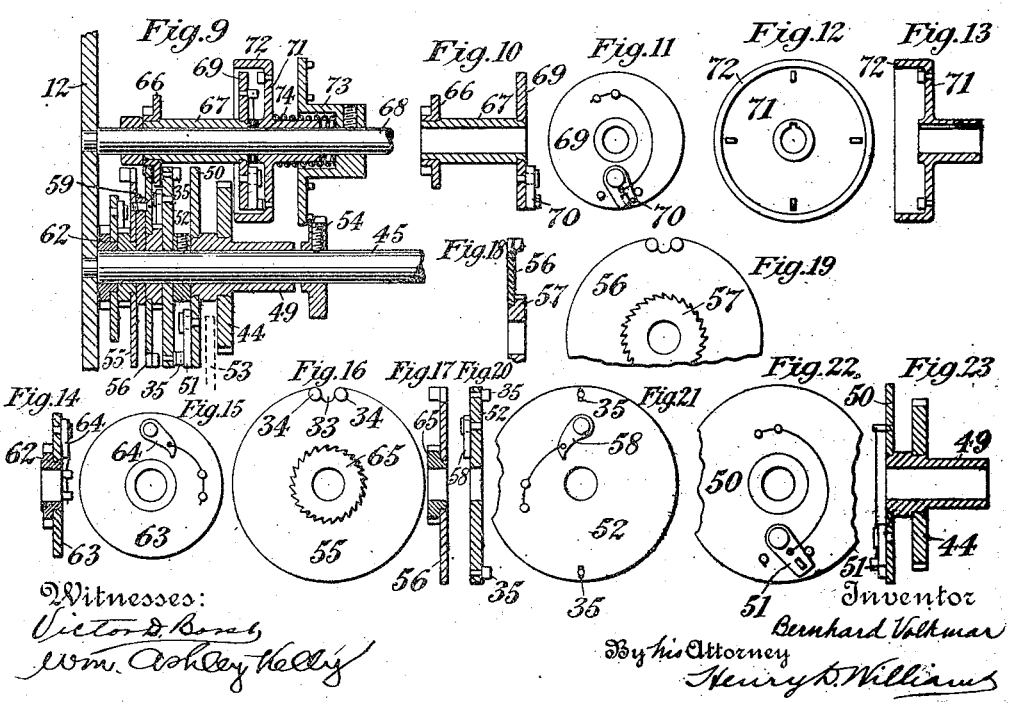
Witnesses:
Inventor
Bernhard Volkmar
By his Attorney
Henry D. Williams B. VOLKMAR.
FARE RECORDING REGISTER.
APPLICATION FILED OCT. 9, 1909.
1,053,252.  Patented Feb. 18, 1913.
9 SHEETS—SHEET 7.
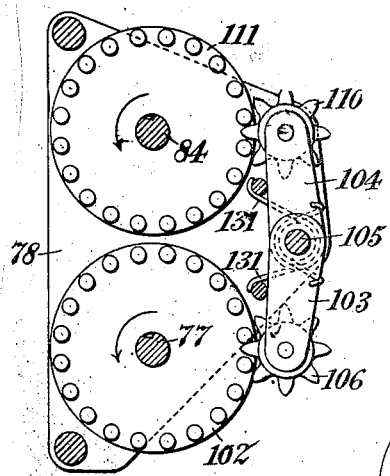
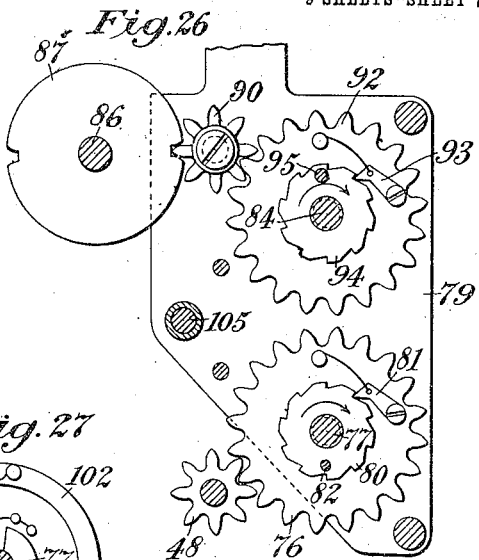
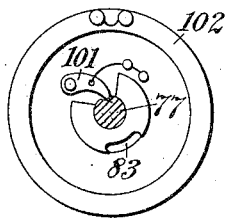
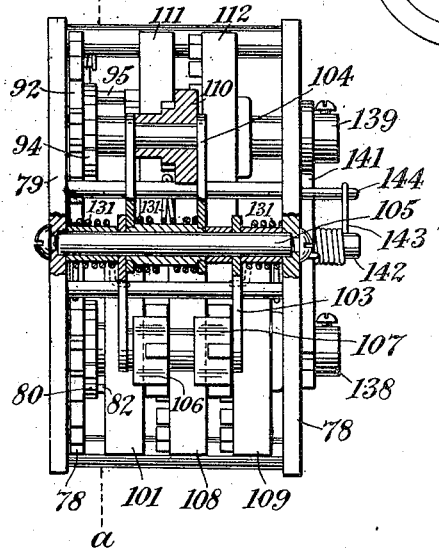
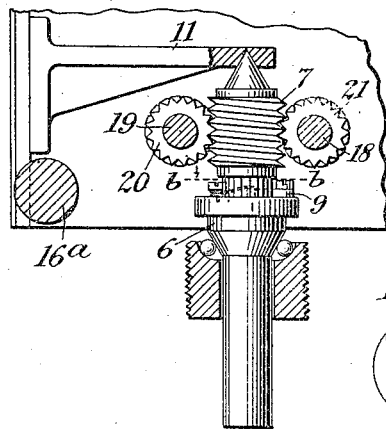
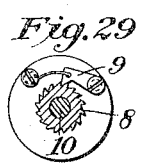
Witnesses:
Inventor
Bernhard Volkmar
By his Attorney
Henry D. Williams B. VOLKMAR.
FARE RECORDING REGISTER.
APPLICATION FILED OCT. 9, 1909.
1,053,252.
Patented Feb. 18, 1913.
9 SHEETS—SHEET 8.
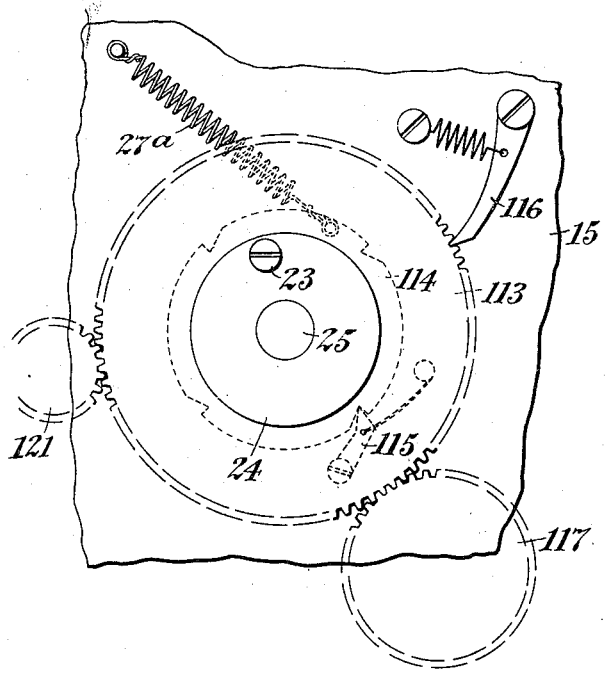
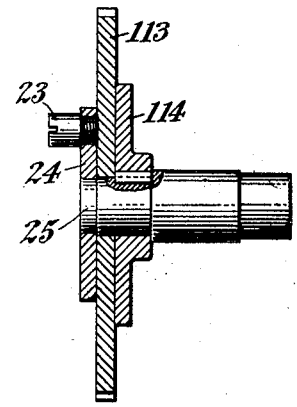
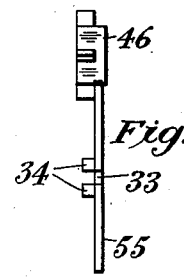
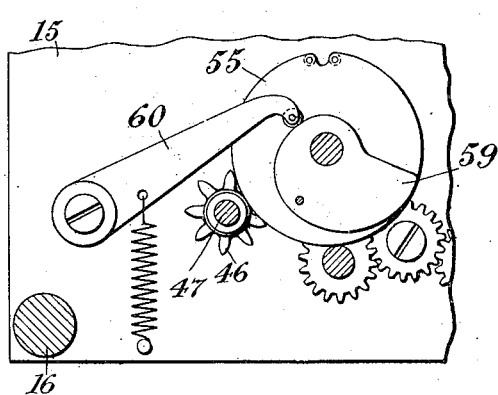
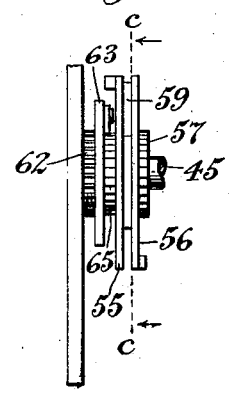
Witnesses:
Inventor
Bernhard Volkmar
By his Attorney
Henry D. Williams B. VOLKMAR.
FARE RECORDING REGISTER.
APPLICATION FILED OCT. 9, 1909.
1,053,252.
Patented Feb. 18, 1913.
9 SHEETS—SHEET 9.
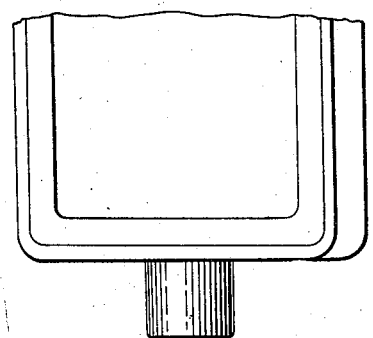
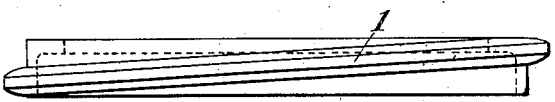
Fig. 35
Fig. 34  Fig. 36
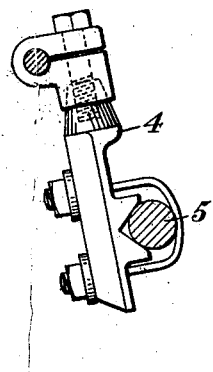
Fig. 37
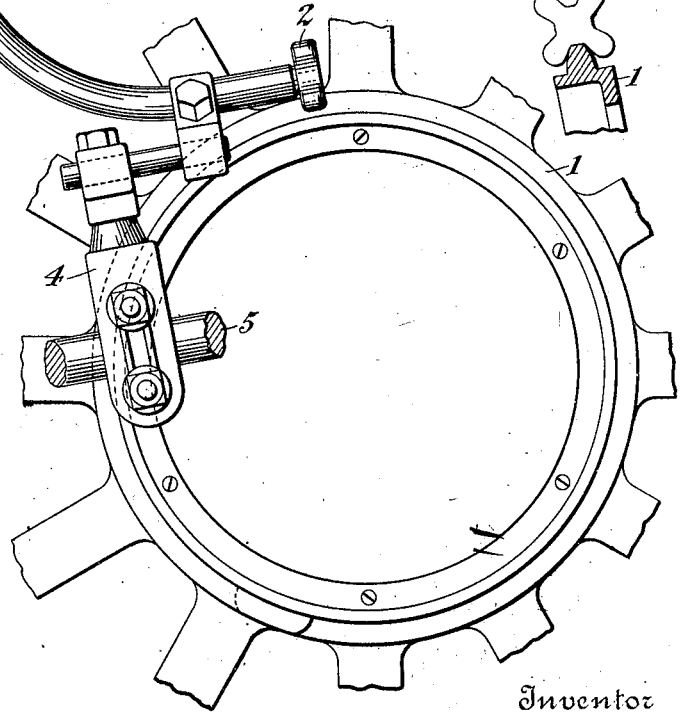
Witnesses:
Victor D. Borel,
Wm. Ashley Kelly
Inventor
Bernhard Volkmar
By his Attorney
Henry D. Williams

UNITED STATES PATENT OFFICE.

BERNHARD VOLKMAR, OF NEW YORK, N. Y., ASSIGNOR TO CONRAD HUBERT, OF NEW YORK, N. Y.

FARE-RECORDING REGISTER.

1,053,252.

Specification of Letters Patent.   Patented Feb. 18, 1913.

Application filed October 9, 1909.   Serial No. 521,920.

*To all whom it may concern:*

Be it known that I, BERNHARD VOLKMAR, a citizen of the United States, residing in the borough of the Bronx, city of New York, in the county of New York and State of New York, have invented certain new and useful Improvements in Fare-Recording Registers, of which the following is a specification, reference being had therein to the accompanying drawings, forming part thereof.

My invention relates to automatic fare indicators for passenger-carrying vehicles of the kind commonly known as taximeters. Such indicators are odometers, that is, registers of the distance traveled, but they properly also register the time spent in waiting when the vehicle is engaged. The reading is commonly made direct in dollars and cents, proportional to the distance and waiting time. They are arranged to indicate to each passenger the amount of his fare for distance traveled and waiting time, and also any extra charges for trunks, etc., and they also usually include totalizers or recorders of the totals of the charges. In many municipalities the rate of charge of public vehicles is regulated and made uniform, and this charge as a rule is determined by the distance traveled when the vehicle is moving, and time spent in waiting, that is, time during which the vehicle is standing still while actually engaged. In nearly all classes of such service there is a uniform minimum fare for a certain distance or any fraction thereof, and therefore the indicator, at its initial setting, shows this amount, and does not begin to register till the predetermined distance has been covered. While the registering mechanism is driven from the wheels of the vehicle in travel, it is usual to employ suitable clockwork to drive the register to indicate waiting time. Since the indicated fares are estimated on both time and distance bases, it is advantageous to have an independent indication of mileage or distance traveled; and an efficient register must be adapted to be reset without destroying the record of previous fares. Such devices are set in operation in various ways, but most commonly, perhaps, by the driver manipulating the sign or flag which indicates whether or not the vehicle is occupied.

It is an object of my invention to produce a taximeter which will obviate the disadvantages of prior devices, and which will be extremely simple, economical and durable, and absolutely reliable.

More specifically, an object of my invention is to provide quick, automatic, resetting means which will be highly advantageous and especially adaptable to my system.

Another object is to eliminate all possibility of tampering with the automatic record.

Another object is to provide quick actuation of the number-wheels, thus precluding any dispute as to the amount registered.

Another object is to provide means for registering the entire distance traveled by the vehicle as well as the distance for which fare is paid; thus putting a check on unauthorized use of the vehicle.

Another object is to register to each passenger the charge for all the distance traveled by him and only such charge, and to so regulate the registering apparatus that the indications for the same route and time will always be substantially identical.

Another object is to provide a device which will be actuated only by the forward movement of the vehicle.

Still other objects and advantages of my invention will appear from the following description.

Means embodying my invention may solely employ rotary transmission devices, and include a transmission to an axially stationary shaft from which the total miles are registered and recorded, and to a shaft shiftable to and from operative position by the manipulation of the sign and from which are registered and recorded the mileage while engaged, and the fare and total fare units so far as recorded from the movement of the vehicle.

A very important feature of my invention is the means which I provide for preventing or reducing to a minimum the charge of the unregistered portion of the trip of one passenger against the next passenger. These means allow the driving mechanism of the fare register to run idly for a predetermined distance first traveled by the vehicle, preferably one-half of a unit of distance, so that this distance will not be registered.

Another very important feature of my invention is the quick resetting means which include transmitting pinions transmitting rotation from one number-wheel to the next, which pinions automatically release as the number-wheels are simultaneously rotated to reset, and means operated directly by the manipulation of the sign to simultaneously rotate the number-wheels and reset them to zero or the predetermined minimum charge or initial fare.

My invention also includes means which coöperate with the actuating mechanism and tend to give an additional forward thrust to the number-wheels as they move when each unit is registered, and so quickly actuate them one complete unit and make the reading certain.

My invention further includes an eccentric connection of a lever with the sign shaft to positively move the shiftable shaft as the sign is manipulated, and also direct connection from the sign to a series of number rolls to register the total number of initial fares, one initial fare being registered each time the sign is lowered, thus also providing means for checking the number of passengers which engage the vehicle.

My invention also includes many combinations and arrangements of parts, as will hereinafter more fully appear.

I shall now describe my invention with reference to the accompanying drawings and shall thereafter point out my invention in claims.

Figures 1, 2 and 3 are front, side and rear elevations, respectively, of my improved taximeter on a reduced scale. Fig. 4 is a front elevation, with the casing in vertical section. Fig. 5 is a rear elevation, with the casing in vertical section. Fig. 5ª illustrates details of the connection of the extras setting knob and shaft. Fig. 6 is a side elevation of the working parts as viewed from the left of Fig. 5, with the side plate removed and part of side plate of the clock broken away. Fig. 7 is a side elevation of the working parts as viewed from the right of Fig. 5, with the side plate removed. Fig. 8 is a bottom view with the casing in section and the parts in operative relation. Fig. 9 is a sectional detail of the main actuating train taken on the line x—x of Fig. 6, looking obliquely downward, and Figs. 10 to 23, inclusive, are details of the parts shown in Fig. 9. Figs. 10 and 11 are a vertical median section and a face view, respectively, of the total fare units clutch wheel. Figs. 12 and 13 are a face view and vertical median section of the total fare units pin wheel. Figs. 14 and 15 are a vertical median section and face view, respectively, of the clock transmitting gear wheel. Figs. 16 and 17 are a face view and vertical median section, respectively, of the fare single-toothed driving wheel. Figs. 18 and 19 are a broken vertical median section and face view, respectively, of the total fare units driving wheel. Figs. 20 and 21 are vertical median sections and a face view, respectively, of the fare pin wheel. Figs. 22 and 23 are a broken face view and a vertical median section, respectively, of the fare clutch wheel. Fig. 24 is a rear elevation, partly in section, of the fare and extras recording mechanism. Fig. 25 is a vertical section of the parts shown in Fig. 24, taken on the line a—a, looking toward the right. Fig. 26 is a similar section of the same parts as Fig. 25, looking in the opposite direction. Fig. 27 is a detail of the left or inner face of the first number-wheel of the fare register, showing the shaft in cross-section. Fig. 28 is a detail elevation of the worm transmission to the axially stationary and axially movable shafts. Fig. 29 is a horizontal sectional detail on the line b—b, Fig. 28, looking down. Fig. 30 is a detail in elevation of the parts carried on the sign shaft and the coöperating parts. Fig. 31 is a substantially vertical central section of the same with the coöperating parts omitted. Fig. 32ª is a detail edge elevation of the coöperating fare driving wheel and intermittently operated pinion. Fig. 32 is a detail, in front elevation, of part of the main driving train. Fig. 33 is a side elevation of the same on the line c—c looking toward the left, with the addition of certain parts. Fig. 34 is an elevation showing the driving connection with the wheel of the vehicle. Fig. 35 is a plan view of the worm on the vehicle wheel hub. Fig. 36 is a detail showing a transverse section of the worm and the pinion driven thereby. Fig. 37 is a detail in side elevation of the supporting bracket.

The register which I have shown as an embodiment of my invention is adapted to indicate on the front dial (see Fig. 1) the extras and the fare in dollars and cents; and on the rear dial (see Fig. 3) all of the totals, including the total initial settings indicated as the total initial minimum fares, and separately the total fares except initial minimum fares, which I term the total fare units, the total extras, these fares and extras indications being in dollars and cents, and also the total miles run and the total miles for which fare is charged, which I term the total registered miles. I have shown fifty cents as the initial minimum fare for the first half mile, and ten cents for each additional quarter of a mile, the latter being the unit of distance and ten cents charge the fare unit for both time and distance, though these charges are selected merely as examples, since they may be changed as desired.

To drive my device from the vehicle, I employ a worm 1 on the hub of one of the wheels (see Figs. 34 and 35) and a pinion 2 on a flexible shaft inclosed in a casing 3 and driven by the worm 1 and held in engagement with the worm by a universal bracket 4 attached to the steering arm 5. The flexible shaft is attached to a driving head 6 provided with ball bearings (see Fig. 28) and connected to a worm 7 by a ratchet 8 and pawl 9 (see Fig. 29) so as to drive the worm 7 only in a forward direction, and to release when the vehicle is moving backward. The worm 7 is provided at its lower end with a stem portion 10 loosely fitting into a corresponding bore in the head 6, and at its upper end it has a cone or point bearing in a bracket 11 attached to the rear wall of the taximeter.

The housing for my device consists of a casing 12, and a front dial 13 and a rear dial 14. Side plates 15 for the mechanism are shown as joined at their base by two cross-bars 16, 16ª, and at the top by a cross-bar 17, and in these side plates are journaled two main shafts 18 and 19, the latter rotating on a stationary axis and the former on an axis angularly movable in a horizontal plane, being journaled at the right side in an elongated bearing (indicated by dotted lines in Fig. 8) and at the left side in a circular bearing in which it fits with sufficient looseness to accommodate the angular movement of the shaft permitted by the elongated bearing.

Worm wheels or pinions 20 and 21 are fastened on the stationary and angularly or bodily movable shafts respectively, in such position that the former is at all times in mesh with the worm 6 and the latter is movable to and from mesh with the worm 6 as the movable shaft is shifted. The worm wheel 21 on the angularly movable shaft 18 is pinned on the shaft so as to allow of slight play, thus assuring that the wheel 21 and the worm 7 will always mesh when brought together. To continuously drive the register of the total miles, I connect it through suitable transmitting means to the stationary shaft 19, and hence this register is always driven by the vehicle regardless of whether or not a fare is being charged, thus providing a check on the use of the vehicle.

From the movable shaft 18 are driven three registers, one indicating the charge for distance traveled and waiting time, known as the fare, one for the total fares exclusive of the initial minimum charge (called total 10 cents or total fare units), and one for the total registered miles. To shift the movable shaft in and out of mesh with the worm 7, means are employed connected directly to the flag or sign 22, the operation of which I shall now describe.

When the sign is up as shown in Figs. 1 to 5, inclusive, it indicates that the vehicle is unoccupied and is for hire, but when the sign is rotated down 90 degrees to the lowered position shown in Fig. 8, the vehicle is engaged. To utilize this movement of the sign to throw the device in and out of operation, I provide an eccentrically arranged operating part or crank pin 23 on a disk 24 rigidly mounted on the inner end of the sign shaft 25, and a releasing lever 26 (see Fig. 7) pivoted near the center to the right side plate 15 and slotted at both ends. The crank pin 23 engages in the upper slot of the releasing lever 26, which thus has a crank and slot connection with the sign shaft 25. The lower slotted end of the releasing lever straddles the movable end of the movable shaft 18. As the sign is moved down to the lowered position, the movable shaft 18 is thereby swung back in mesh with the worm 7 in the position shown in Fig. 8, and as the sign is raised when a passenger is discharged, the movable shaft is swung forward out of mesh. To insure that, if anything prevents the pinion 21 being moved fully into mesh with the worm 7 as the sign is lowered, the movement will be completed as soon as the impediment is removed, as, for example, if the teeth on the pinion are so positioned that they strike on the ends of the teeth on the worm instead of meshing with them as the pinion is moved up, and the play of the pinion does not regulate this, I have shown the releasing lever 26 broken near its lower end, and a spring 26ª, coiled about the pivot, bears with one end against a pin on the upper portion of the lever, and with its other end bears against the lower portion of the lever and tends to hold the two portions of the lever in alinement, as shown in Fig. 7. If the ends of the teeth of the pinion 21 and worm 7 engage as the sign is lowered, the lever 26 breaks at the pivot, while the spring 26ª tends to move the lower portion of the lever into alinement with the upper portion, and the spring performs this function as soon as the worm 7 is rotated sufficiently, thus insuring that the pinion 21 and the worm 7 will always mesh when the sign is lowered. A coiled spring 27ª is fastened at one end to the casing 15 and at the other end to a part fixed on the sign shaft and tends to hold the sign back and prevent it from being lowered too forcibly and injuring the parts, and a manually operatable spring stop 27 is pressed into a hole or socket 28, one being provided through the casing at each end of the quadrant which constitutes the path of the stop 27, thus releasably locking the sign in the position in which it is set, and midway between the two sockets 28 is a shallow socket 28ª extending but part way through the casing and serving as an intermediate stop, the purpose of which will appear later. A spring plunger 29 is provided on the casing to take up the jar and prevent the sign from being rotated down too far, and a similar stop 29ª is also provided at the upper end of the quadrant.

Each registering mechanism comprises a series of number-wheels registering in the usual way, each wheel, up to the last, at each complete rotation, actuating the adjacent wheel one number. The details of this transmission from one number-wheel to the next will be fully described hereinafter. I shall first describe the means employed for actuating the first number-wheel. First, referring to the total miles register, driven, as previously mentioned, from the stationary shaft 19 to register the entire distance traversed by the vehicle, whether occupied or not, I employ on the shaft 19 an intermittent or stop gearing, which is frequently used in my mechanism. This gearing comprises a driving wheel 30, in this instance having a single tooth-engaging notch, and a coöperating pinion 31 having alternately full width and half width teeth. The action of these coöperating wheels can best be understood by reference to Fig. 32$^a$, in which is shown one of the intermittent driving wheels 55 (see also Figs. 6 and 16) having one tooth-engaging notch 33, and coöperating with an intermittently driven pinion 46. The driven pinion 46 has alternate full-width and half-width teeth, four of each, which is the most convenient number. On each side of the tooth-engaging notch 33 is a laterally-projecting pin or lug 34. The intermittently driven pinion 46 in locked position rides with two adjacent full-width teeth on the periphery of the driving wheel and with the intermediate half-width tooth projecting along the side in the path of the lugs 34. As the intermittent driving wheel rotates, the lug 34 in advance engages the narrow tooth and rotates the intermittently driven pinion and the rear full-width tooth rolls down between the lugs 34 and into the notch 33. The further rotation of the driving wheel carries that full-width tooth up on the periphery and the one behind it now also rests on the periphery and the intermediate narrow tooth is in the path of the lugs 34, and the two full-width teeth lock the intermittently driven pinion against further actuation until the advance lug of the driving wheel in its rotation strikes the narrow tooth in its path. This operation is repeated in the case illustrated in Fig. 32$^a$ once for every rotation of the intermittent driving wheel, and in every case once for every tooth-engaging notch in the intermittent driving wheel during one rotation of this wheel.

The driven pinion 31, which, as above described, is actuated by the intermittent driving wheel 30 on the stationary shaft 19, meshes with a driven pinion 36 which actuates the first number-wheel 32 of the total miles series, this number-wheel denoting tenths of a mile. This number-wheel has ten numbers on its face and twenty pins projecting laterally from its periphery as shown, and the driven pinion 36 meshes with these pins and rotates the number-wheel two pins or one number with each actuation. This number-wheel has on its periphery one tooth-engaging notch with lugs on each side of it (not shown) similar to the tooth and lugs shown on the intermittent driving wheel 55, and a transmitting pinion 37 coöperates with this wheel in the same way as the driven pinion 46 coöperates with the variable-toothed driving wheel 55, and meshes with the laterally projecting pins of the next number-wheel, and thus actuates the next number-wheel one number for each complete rotation of the first number-wheel. There is a similar transmission from each successive number-wheel, and this same system is employed in each registering mechanism.

The total recorded miles register is driven from the angularly movable shaft 18, as previously stated, so as to record only when the device is in operation and a fare is being charged. The train for driving this registering mechanism consists of the gear 38 (see Fig. 6) rigid on the shaft 18, the intermediate gear 39, mounted on a stud on the side plate 15, a gear 40, loose on the stationary shaft 19, and an intermittent driving wheel 41 pinned to the gear 40 and also loose on the shaft 19, which is here utilized only as a bearing for the wheels 40 and 41. The intermittent driving wheel 41 has one tooth-engaging notch and coöperates with a driven pinion 42 which in turn drives the first number-wheel of the recorded miles register, the successive number-wheels of this register being driven in the manner previously described.

The fare register is actuated through the medium of the main train shown in detail in Figs. 9 to 23, inclusive, which train is driven from the angularly movable shaft 18. The gear wheel 43, rigidly mounted on the shaft 18 (see Fig. 8) meshes with and drives a gear wheel 44, loosely mounted on a shaft 45 located above the angularly movable shaft 18. Since it is desirable that the fare read directly in dollars and cents, the ratio of this gearing must be arranged according to the charge per unit of distance. I have shown a device adapted to record ten cents for every quarter of a mile, and the ratio is two and one-half to one, the angularly movable shaft 18 being rotated ten times to the mile, and the gear wheel 44 is rotated four times to the mile or once for every quarter of a mile. From the gear wheel 44 the main train, illustrated in Fig. 9, is driven, which drives an intermittent driving wheel 55, loosely mounted on the same shaft 45, and the latter drives a pinion 46. This pinion 46 is rigidly mounted on a shaft 47, and another pinion 48 rigidly mounted on the same shaft 47 actuates the fare-registering mechanism.

As shown in Fig. 4, the illustrated device is adapted to register fifty cents as the minimum fare shown at the initial setting, though this can easily be changed to record any desired amount, as will later be described. This fifty cents is for the first half mile, or any fraction thereof, and since the mechanism registers ten cents for each quarter of a mile in advance, the fare register and the total fare units register are each actuated one unit or ten cents at the completion of the first half mile, but this actuation is deferred till the completion of the first half mile. In addition to this, as previously described, it is desirable to prevent the device from registering against one passenger all of a unit of distance which the previous passenger would have had registered against him had he gone a very little farther. To provide against this, I defer the action of the gear wheel 44 upon the main driving train for the first half of the first quarter of a mile, as will later appear. I shall now describe my means for accomplishing these combined results.

The gear wheel 44 is rigidly mounted on a sleeve 49, on which is also rigidly mounted a clutch wheel 50, so that the clutch wheel is actuated with the gear wheel (see Figs. 22 and 23). A clutch member 51 is pivoted on the face of the clutch wheel, two stop-pins being provided to limit its oscillation, and a spring tends to rotate it ahead to the forward position shown in Fig. 22 against the forward stop. A pin wheel 52 is also loosely mounted on the shaft 45 separated from the clutch wheel 50 by a collar fixed on the shaft, as shown, and with two diametrically opposite pins 35 on its face in the path of the clutch 51. As the clutch wheel is rotated, the clutch engages one of the pins on the pin wheel which rotates the clutch back against the back stop-pin, after which the clutch wheel carries the pin wheel along in its rotation. A shifting disk 53 is rigidly mounted on the angularly movable shaft 18 and extends between the gear wheel 44 and the clutch wheel 50 in the position shown in dotted lines in Fig. 9. As the sign is raised and the angularly movable shaft moved out of engagement with the worm 7, the shifting disk 53, by reason of the combined angular and bodily movement imparted to it by the movement of the shaft 18, bears against the gear wheel 44 and moves the gear wheel 44 and the clutch wheel 50 back till the sleeve 49 comes in contact with a collar 54 on the shaft 45, thus releasing the clutch 51 from the pin 35 on the pin wheel with which it is in engagement, and the spring immediately carries the clutch ahead of the pin against its forward stop-pin. Consequently as the angularly movable shaft is again moved back into operative position, the shifting disk bears against the clutch wheel and carries the clutch wheel back to its original position, but the clutch 51 is now ahead of the pin 35 on the pin wheel with which it was formerly in engagement, and consequently the clutch wheel runs idly when the vehicle is started until the clutch engages the next pin, that is for one half of a rotation or one-eighth of a mile. This arrangement allows the utmost variation from the true record of less than one-eighth of a mile instead of a quarter of a mile, as heretofore has been the case. Suppose, for example, that one passenger had but an eighteenth of a mile to go to have a new quarter of a mile or ten cents registered against him, the registering being done in advance, of course. Since the device is set primarily to a minimum fare for the first half mile, theoretically, the next passenger should ride just a half mile and then an additional ten cents should be charged against him. But in this suppository case he would go but the eightieth of a mile and a quarter of a mile instead of half a mile and then the additional ten cents would be registered; while in my device he gets the additional advantage of the first eighth of a mile when the clutch wheel runs idle. The distance during which the clutch wheel runs idle can, of course, be varied as desired by altering the number of pins on the pin wheel, but it has been found that an eighth of a mile or half the unit of fare gives a substantially true record on an average and is most satisfactory.

Next to the pin wheel 52 and also mounted loosely on the shaft 45 are two intermittent driving wheels 55 and 56, each having one tooth-engaging notch, the former actuating the fare-registering mechanism and the latter actuating the total fare units registering mechanism. These wheels are fastened together with the teeth diametrically opposite, as shown, and a ratchet 57 is provided on the wheel 56, and a spring pressed pawl 58 on the pin wheel 52 engages the ratchet 57 and carries the wheels 55 and 56 along in the rotation of the pin wheel. The intermittent driving wheel 55 coöperates with the pinion 46 and actuates the fare-registering mechanism, as previously described.

To effect quick and positive actuation by the intermittent driving wheels 55 and 56, a cam 59 is fastened between them (shown particularly in Figs. 32 and 33) and a spring pressed lever 60, pivoted to the side wall 15, rides on this cam 59, and just as the wheels 55 and 56 actuate their coöperating pinions, the lever 60 rides off the cam face and forces the wheels quickly through their actuating function.

To drive the actuating mechanism when the vehicle is engaged and waiting, a clock mechanism 61 is provided which is differentially connected to the actuating mechanism through a train of gears 126, 127, 128 and 62 (see Fig. 6). The last gear wheel 62 of this train of gears is mounted loosely on the end of the shaft 45, and is driven continuously by the clock work when the sign is down. A wheel 63 is attached to the gear wheel 62 and rotates with it, and a spring pressed pawl 64 on the face of the wheel 62 coöperates with a ratchet 65 on the intermittent driving wheel 55 (see Figs. 16, 17, 20 and 21). When the intermittent driving wheel 55 is driven by the vehicle at a rate exceeding two and one-half miles an hour, it moves faster than it would if driven by the clock wheel 62, and the teeth of the ratchet 65 therefore ride past the pawl 64, but as soon as the vehicle stops or falls below the minimum low speed above stated, the pawl 64 engages in the ratchet 65 and rotates the intermittent driving wheels. A lever 88 having a laterally projecting arm provided with a spring 88<sup>a</sup> engages against the escapement shaft of the clock (see Fig. 5) to lock the clock movement, and this lever 88 is connected to the releasing lever 26 by a link 89 (see Fig. 7) so as to be moved to and from locking position by the manipulation of the sign simultaneously with the shifting of the movable shaft 18 from and to operative position.

As previously stated, the intermittent driving wheel 56 drives the mechanism which actuates the total fare units register, and for this purpose coöperates with a pinion 66. The teeth are so situated that the total fare units register and the fare register are actuated simultaneously. Since the fare register is originally set at an initial fare for the first half mile, the passenger is entitled to the use of the vehicle for two units of fare, and the first actuation for a quarter of a mile is therefore idle, and the second actuation effects the fare registering mechanism at the completion of the first half mile, since the fare is registered every quarter of a mile in advance. As the total initial fares are separately registered, it is desirable that the so-called total fare units shall not include the initial fares, and therefore the total fare units register is not actuated until the completion of the first half mile. For the fare register, this end is attained by a slot in the first number-wheel, as will be later described, for the total fare units register, a clutch and pin connection is employed similar to that in the main train previously described. The transmitting pinion 66 is rigidly mounted on a sleeve 67 which is mounted loosely on a shaft 68 (see Fig. 9) slightly above and back of the shaft 45. On the other end of the sleeve 67 is a clutch wheel 69, having a clutch 70 (see Figs. 10 and 11), and similar to the clutch wheel 50. A pin wheel 71 coöperates with the clutch wheel 69, and has four pins arranged 90 degrees apart on its face (see Figs. 12 and 13). This pin wheel 71 is provided with an annular flange 72, which fits over the clutch wheel 69 and projects in proximity to the gear wheel 44 on the main train. The pin wheel 72 is splined on the shaft 68, and an intermittent driving wheel 73 is pinned on the shaft adjacent to the pin wheel 72. A coiled spring 74 about the shaft 68 bears at one end against the intermittent driving wheel 73, and at the other against the pin wheel 71 and tends to hold the pin wheel in engagement with the clutch wheel. The intermittent driving wheel 73 has four tooth-engaging notches and coöperates with a pinion 75 which actuates the first number-wheel of the total fare registering mechanism. Since the driving wheel 73 has four notches, it effects four actuations to each rotation or one every quarter of a mile. When the gear wheel 44 is moved over by the shifting disk 53 as previously described, it bears on the flange 72 of the pin wheel 71 and forces the pin wheel over till the clutch 70 slips past the pin with which it is in engagement, and when the sign is again lowered and the disk 53 returned to its first position, the spring 74 forces the pin wheel 71 back with the pins in the path of the clutch 70, but when the vehicle starts the clutch wheel 69 makes one quarter of a rotation or is driven a distance equivalent to one quarter of a mile before the next pin in engaged and the pin wheel taken up. In this way, the actuation of the total fare units register is deferred to the end of the first half mile.

The intermittently driven pinion 48 on the shaft 47 actuates the first number-wheel of the fare register as previously mentioned. It coöperates with a gear wheel 76, as shown particularly in Fig. 26. The gear wheel 76 is mounted loosely on a shaft 77, on which are loosely mounted the fare number-wheels and which has its end bearings between two side-plates 72 and 79, between which are contained the fare registering mechanism and the extras registering mechanism. A ratchet 80 is also loosely mounted on the shaft 77, between the gear wheel 76 and the first number-wheel, and a spring-pressed pawl 81 on the gear wheel 76 engages in the teeth of the ratchet 80. The ratchet 80 is connected to the first number-wheel by a pin 82, which extends in a slot 83 in the first number-wheel (see Fig. 27). This slot is arcuate and is thirty-six degrees in length, or the same number of degrees as the circumferential distance between the numbers on the face of the number-wheel. The pin 82 at its initial setting is in the rear end of the slot 83 and, therefore, at the first actuation of the gear wheel 76, the pin 82 moves idly through the slot 83; but at the next actuation it carries the number-wheel along. Thus, a half mile is traversed before there is an actuation of the fare register, and the passenger, therefore, rides a half mile for his initial minimum setting of fifty cents before an additional ten cents is registered.

The extras registering number-wheels are mounted on a shaft 84 above the fare number-wheels. They are set by hand by operating a setting knob 85 below the sign.

The knob 85 is attached to an operating shaft 86 so that it may be removed therefrom to allow the side plate 15 and the working mechanism to be taken out of the casing intact (see Figs. 5 and 5ª), the knob being secured, as by screw threads, upon a short shaft 129 having a slotted enlargement on its inner end receiving a projecting pin 130 on the end of the setting shaft 86. On the shaft 86 is mounted a spaced toothed driving wheel 87 having two diametrically opposite teeth on its periphery (see Fig. 7), each adapted to actuate two transmitting pinions 90 and 91. The transmitting pinion 90 is in engagement with a gear wheel 92 which is mounted on the shaft 84 and connected by a pawl 93 to a ratchet 94, also mounted on the shaft 84 (see Fig. 26). The ratchet 94 is connected by a pin 95 to the first extras number-wheel (see Fig. 4), and hence as the pinion 90 is actuated, it imparts its actuation to the first extras number-wheel through the gear wheel 92 and the ratchet 94. The transmitting pinion 91 is rigidly mounted on the shaft 96 back of the extras operating shaft 86, on which is also rigidly mounted a four-toothed driving wheel 97 which drives a transmitting pinion 98, which in turn actuates the total extras register. The four-toothed pinion 97 is actuated one tooth with each actuation of the transmitting pinion 91 since all of the transmitting pinions, is given one quarter of a turn or one full width tooth, with each actuation. Thus with every complete turn of the knob 85, both the extras and total extras register are actuated two units. The driving wheel 87 is connected to the shaft 86 by a pawl 99 (see Fig. 7) which coöperates with a ratchet 100 rigidly mounted on the setting shaft 86. This ratchet connection makes it possible to set the extras by the knob 85, but prevents tampering with the record by turning the knob back.

The method of transmitting movement from one number-wheel to the one of next higher denomination through the transmitting pinions has been described. All of the totalizing records on the rear dial are, of course, continued from one passenger's record to the next, but the extras and the fare registers on the front dial are reset at the conclusion of each individual record. This resetting is done in my taximeter by the manipulation of the sign, as will now be described.

Referring to Figs. 24 to 27, the number-wheel shafts 77 and 84 are each provided with a single longitudinal groove and on each number-wheel is a spring-pressed pawl 101. In the first number-wheel 102 of the fare register, the pawl 101 is so set that it takes in the groove on the shaft when it indicates 5, and since there is a blind zero as shown for both the extras and fare, this indication of 5 on the wheel of the lowest denomination, taken with the blind zero, reads fifty cents or the initial setting. The pawl 101 may of course be located so as to make this initial reading anything that is desired. The pawls 101 on all the remaining number-wheels of the fare register and on all the number-wheels of the extras register are so set that they take in the groove on the shaft when they indicate zero. When the number-wheels are rotated about the shafts to register the fare or extras, to the left or counter-clock-wise as shown in Fig. 27, the pawls 101 ride out of their grooves and around their shaft idly; but when the shaft is moved or rotated in the same direction it will pick up the wheels and aline them through the medium of the pawls and groove. This rotation of the number-wheel shafts 77 and 84 is effected by the movement of the sign as will presently appear. As the number-wheels are thus rotated to reset them, the ratchets 80 and 94 are, of course, rotated along with the first number-wheels and the pawls 81 and 93 merely ride over the ratchets. The first fare number-wheel does not carry the ratchet 81 along until the pin 82 has reached the back end of the slot 83, and therefore the pin 82 is always at the rear end of the slot when the resetting is completed, as previously mentioned. It is evident that this resetting of the fare and extras number-wheels is ordinarily prevented by the transmitting pinions which are locked at their peripheries in the manner previously described. To obviate this difficulty, I provide means for holding the transmitting pinions in yielding engagement with the number-wheels so that the pinions automatically release as the number-wheels are reset. In all of the totals registers, the pinions are axially stationary and resetting or altering them is impossible, but in the registers which are to be reset, the transmitting pinions are carried by pivoted arms pressed by springs against the number-wheels. Referring particularly to Figs. 24 and 25, the arms 103 and 104 are each pivoted on a shaft 105, and springs 131 pull these arms toward the number-wheels, as shown. The pinions 106 and 107 are carried by the arm 103 and are held so that their half-width teeth are between the fare number-wheels 101 and 108, and 109 and 108, respectively, so as to be in operative connection therewith. Similarly the pinion 110 on the arm 104 is held so that its half width teeth enter between the two extras number-wheels 111 and 112 and in operative connection therewith. Now it is evident that the pinions 106, 107 and 110, although performing their function of transmitting actuation from one number-wheel to the one of next higher denomination, will nevertheless yield when the number-wheels are actuated by their shafts through the pawl and groove connections above described and will thus allow the number-wheels to be rotated together and reset. Spring-pressed detents 136 and 137 (see Fig. 4) bear against the crown teeth of the first fare number-wheel and the first extras number-wheel, respectively, to hold them in the position in which they are automatically set.

To rotate the number-wheel shafts 77 and 84 by the manipulation of the sign shaft, a gear wheel 113 is loosely mounted on the sign shaft 25 (see Figs. 30 and 31) and a ratchet 114, having four teeth, is keyed on the sign shaft, so that the disk 24 and the ratchet 114 hold the gear wheel 113 between them, as shown. A pawl 115 on the gear wheel 113 is pressed by a spring in engagement with the ratchet 114. A locking pawl 116 on the casing 15 engages in the teeth of the gear wheel 113 and locks the gear wheel against backward rotation. The gear wheel 113 transmits its rotation through gears 117 and 118 (see Fig. 4) to shaft 119 on which is a pinion 120, which meshes with a pinion on the number-wheel shaft 84 and a pinion on the number-wheel shaft 77. Through this train of gears the rotation of the gear-wheel 113 is communicated to the shafts 84 and 77 and hence resets the number-wheels as previously described. The stops 29 and 29ᵃ on the casing 12 are just ninety degrees apart as are the teeth on the ratchet 114. When the sign is way down, the pawl 115 is in a tooth on the ratchet 114, and when the sign is raised, the ratchet turns around till the pawl 115 just drops in the next tooth. Then as the sign is put down again, the gear wheel 113 is rotated just ninety degrees. The pawl 116 prevents the gear wheel 113 from being rotated back as the sign is raised, but the sign must be raised way up against the stop 29ᵃ before the pawl 115 drops in another tooth in the ratchet 114. This arrangement prevents a dishonest driver from tampering with the record, for the sign must be put way down and the fare reset to its initial setting before the device is thrown into operation, and the movement of the sign must be a whole quadrant to be effective. The ratio of gearing is such that the quarter turn of the gear wheel 113 gives the number-wheel shafts 84 and 77 only one complete turn, since the momentum produced by too rapid turning of the number-wheels might tend to carry them past their alined position.

To lock the sign in an intermediate position, the shallow socket 28ᵃ is provided in the path of the stop 27 midway between the sockets 28. If it is necessary to stop the vehicle when it is engaged, as to make some repair, during which the passenger should not pay waiting time, the sign may be raised until the stop 27 springs in the socket 28ᵃ. The clock is thereby stopped and the mechanism is thrown out of operation, while the sign is locked against the possibility of being accidentally raised way up, which would necessitate the charge of extra initial fare when the sign is lowered. When it is desired to continue the trip, the stop 27 may be released and the sign lowered again without any alteration in the fare having been registered. The intermediate stop 28ᵃ also coöperates with the spring 27ᵃ to prevent the flag from being lowered too forcibly.

To assure that the extras and fare number-wheels will be always brought up to proper position when reset, I provide additional self-resetting means, which become operative near the end of the movement. On the end of the shafts 77 and 84 extending through the wall 78, I secure knobs 138 and 139, respectively, and on each knob is a V-notch 140, which serves as a cam face. A double lever or detent 141, having engaging projections or teeth reversely formed on the opposite ends, is pivoted on a stud 142 on the wall 79 between the two shafts, and a spring 143 is coiled about the stud 142 and bears with one end about a pin 144 on the wall 79 and with the other end against the lever 141 and holds the engaging projections of the lever 141 against the knobs 138 and 139. As the engaging projections ride down the cam faces of the notches, they give a final impulse to the knobs and their shafts and quickly rotate the shafts till the number-wheels are brought up to place, and hold the shafts in position. In this way any wear on the gearing leading from the sign shaft, or any other looseness or play in the parts, is compensated for.

The rotation of the gear wheel 113 also actuates the register of the total initial settings which I term the total fifty cents. The gear wheel 113 meshes with a pinion 121 and the ratio of gearing between the two is 4 to 1, so that a one-quarter turn of the gear wheel 113 imparts one complete rotation to the pinion 121. The pinion 121 is rigidly mounted on a shaft 122 (see Fig. 6), and a driving wheel 123 having five teeth is also rigidly mounted on the shaft 122 and coöperates with a transmitting pinion 124, which meshes with another transmitting pinion 125 which actuates the first number-wheel of the total fifty cents register. Since the driving wheel 123 has five teeth, the register is actuated five units or fifty cents, the minimum fare, when the sign is lowered. If it is desired to alter this minimum fare, it is merely necessary to make a corresponding change in the number of teeth in this pinion and to set the pawl 101 on the first fare number-wheel to the proper position. If the sign is rotated only part way down, the total fifty cents is not fully registered, nor are the number-wheels reset, and the mechanism is not placed in operative position, since the releasing lever 26 does not move the movable shaft into mesh with the worm till the end of its movement. If the sign is then moved back it does not get a new hold on the gear wheel 113 since the pawl 115 cannot be rotated back far enough to catch another tooth. It is therefore impossible to tamper with the record by manipulating the sign.

The details of the operation of my taximeter have been described in connection with the mechanism. The raising of the sign when a passenger reaches his destination merely throws the mechanism, all except the total miles register, out of operation, and locks the clock movement. When the next passenger hires the vehicle, the sign is lowered, which movement resets the fare and extras register, and throws the mechanism into operation and releases the clock. During the first eighth of a mile traversed, the movement necessary to reach the next registering point, and thereafter for a quarter of a mile or its money equivalent in waiting time, the fare and total fare registering mechanism are not actuated. The actuations for the next and the succeeding quarters of a mile and their equivalents in waiting time are then recorded.

It is obvious that various modifications may be made in the construction shown and above particularly described within the principle and scope of my invention.

I claim:

1. In a fare register for vehicles, in combination with a sign shaft, shiftable transmitting mechanism operated by the vehicle, registering mechanism operated by the transmitting mechanism, eccentric actuating means on the sign shaft, and means adapted to be forced by the eccentric means to shift the transmitting mechanism into operative connection with the registering mechanism when the sign shaft is rotated in one direction, and adapted to be forced by the eccentric means to shift the transmitting mechanism out of operative connection with the registering mechanism when the sign shaft is rotated in the other direction.

2. In a fare register for vehicles, in combination with a sign shaft, shiftable transmitting mechanism operated by the vehicle, registering mechanism operated by the transmitting mechanism, eccentric actuating means on the sign shaft, and a lever connecting the eccentric means and transmitting mechanism and adapted to be forced by the eccentric means to shift the transmitting mechanism into operative connection with the registering mechanism when the sign shaft is rotated in one direction, and adapted to be forced by the eccentric means to shift the transmitting mechanism out of operative connection with the registering mechanism when the sign shaft is rotated in the other direction.

3. In a fare register for vehicles, in combination with a sign shaft, a bodily movable shaft, transmitting mechanism mounted thereon and operated by the vehicle, registering mechanism operated by the transmitting mechanism, eccentric actuating means on the sign shaft, and a lever connecting the eccentric means and the movable shaft and adapted to be forced by the eccentric means to shift the movable shaft to bring the transmitting mechanism into operative connection with the registering mechanism when the sign shaft is rotated in one direction, and adapted to be forced by the eccentric means to shift the movable shaft to bring the transmitting mechanism out of operative connection with the registering mechanism when the sign shaft is rotated in the other direction.

4. In a fare register for vehicles, in combination with a sign shaft, transmitting mechanism operated by the vehicle, registering mechanism operated by the transmitting mechanism, eccentric actuating means on the sign shaft, a jointed lever positively operated by the eccentric means for shifting the transmitting mechanism into and out of operative position, and resilient means arranged to permit the lever to yield at the joint and tending to hold the two portions of the lever in alinement.

5. In a fare register for vehicles, in combination with a sign shaft and eccentric actuating means thereon, a bodily stationary and a bodily movable shaft, transmitting means on the stationary and movable shafts operated by the vehicle, mechanism for registering the total miles operated by the transmitting means on the stationary shaft, mechanism for registering the total registered miles operated by the transmitting means on the movable shaft, and means positively operated by the eccentric means on the sign shaft for shifting the movable shaft in both directions.

6. In a fare register for vehicles, registering mechanism adapted to receive intermittent actuation, transmitting mechanism adapted to intermittently actuate the registering mechanism, continuously driven actuating means for the transmitting mechanism, connecting means in the actuating means arranged to intermittently operatively connect the actuating means and the transmitting mechanism, an auxiliary impulse device coöperating with the actuating means to impart quick actuation through a given phase and arranged to become operative at each operation of the connecting means, vehicle-driven driving means for driving the actuating means, and means for permitting the driving means to run idly during a predetermined period when the fare register is thrown into operation.

7. In a fare register for vehicles, registering mechanism adapted to receive intermittent actuation, transmitting mechanism adapted to intermittently actuate the registering mechanism, continuously driven actuating means for the transmitting mechanism, connecting means in the actuating means arranged to intermittently operatively connect the actuating means and the transmitting mechanism, an auxiliary impulse device adapted to impart quick actuation through a given phase simultaneously with each operation of the connecting means, comprising a cam in the actuating means, and a spring-pressed lever coöperating with the cam; vehicle-driven driving means for driving the actuating means, and means for permitting the driving means to run idly during a predetermined period when the fare register is thrown into operation.

8. A fare register for vehicles, in combination with a sign shaft, a bodily movable shaft, transmitting mechanism mounted thereon and operated by the vehicle, registering mechanism operated by the transmitting mechanism, eccentric actuating means on the sign shaft, a jointed lever positively operated by the eccentric means for shifting the movable shaft to bring the transmitting mechanism into and out of operative position, and resilient means arranged to permit the lever to yield at the joint and tending to hold the two portions of the lever in alinement.

9. In a fare register for vehicles, in combination with a sign shaft, an eccentric actuating means thereon, a bodily stationary and a bodily movable shaft, transmitting means on the stationary and movable shafts operated by the vehicle mechanism for registering the total miles operated by the transmitting means on the stationary shaft, mechanism for registering the total recorded miles operated by the transmitting means on the movable shaft, a jointed lever positively operated by the eccentric actuating means for shifting the movable shaft in both directions, and resilient means arranged to permit the lever to yield at the joint and tending to hold the two portions of the lever in alinement.

10. In a fare register for vehicles, in combination with a sign shaft, registering mechanism including successive number-wheels and transmitting pinions between the number-wheels and automatically releasable therefrom to allow resetting, actuating mechanism for the first number-wheel, and means actuated by the rotation of the sign shaft for resetting the number-wheels.

11. In a fare register for vehicles, in combination with a sign shaft, means operated by the rotation of the sign shaft for throwing the fare register into and out of operation, a registering device for indicating extras including a number-wheel shaft and number-wheels mounted thereon, the number-wheels being adapted to be reset by the rotation of the number-wheel shaft, manually operated means for setting the registering device, and means independent of the manually operated means and positively actuated by the rotation of the sign shaft for rotating the number-wheel shaft to reset the number-wheels when the shaft is rotated to throw the fare register into operation.

12. In a fare register for vehicles, in combination with a sign shaft, means operated by the rotation of the sign shaft for throwing the fare register into and out of operation, a registering device for indicating extras including a number-wheel shaft and number-wheels mounted thereon, the number-wheels being adapted to be reset by the rotation of the number-wheel shaft, registering mechanism for indicating total extras, manually operated means for simultaneously actuating both registering devices, and means independent of the manually operated means and positively actuated by the rotation of the sign shaft for rotating the number-wheel shaft to reset the number-wheels of the registering mechanism for indicating extras when the shaft is rotated to throw the fare register into operation.

13. In a fare register for vehicles, in combination with a sign shaft, means operated by the rotation of the sign shaft for throwing the fare register into and out of operation, registering devices for indicating respectively the fare and extras, each registering device including a number-wheel shaft and number-wheels mounted thereon, the number-wheels being adapted to be reset by the rotation of the number-wheel shaft, manually operated means for setting the registering device for indicating extras, and means independent of the manually operated means and positively actuated by the rotation of the sign shaft for rotating the number-wheel shafts of the registering devices to reset the number-wheels when the shaft is rotated to throw the fare register into operation.

14. In a fare register for vehicles, in combination with a sign shaft, registering mechanisms for indicating the fare and the extras respectively, each registering mechanism including a succession of number-wheels, and transmitting pinions between the number-wheels held in yielding contact therewith to allow resetting, and means actuated by the rotation of the sign shaft for resetting the number-wheels.

15. In a fare register for vehicles, in combination with a sign shaft, a fare-registering mechanism adapted at its initial setting to indicate a minimum fare, a registering mechanism adapted to record the total of initial fares, and means operated by the rotation of the sign shaft for simultaneously resetting the fare-registering mechanism to its initial setting and to actuate the registering mechanism of total initial fares.

16. In a fare register for vehicles, a plurality of vehicle and chronometer driven registering devices, a main driving train for the fare register, transmitting means between the main driving train and the separate registering devices, means for deferring the actuation of the registering device by the transmitting means, and means for allowing the driving train to run idly relatively to the transmitting means during a predetermined period to produce an additional period of deferred actuation of the registering devices.

17. In a fare register for vehicles, a plurality of vehicle and chronometer driven registering devices, a main driving train for the fare register, transmitting means between the main driving train and the separate registering devices, including an abutment device, and an engaging member in the driving train adapted to engage the abutment device, and means for releasing the engaging member from and permitting it to pass the abutment device as the fare register is thrown out of operation.

18. In a fare register for vehicles, registering mechanism, actuating mechanism for the registering mechanism including a pin wheel, driving mechanism for the actuating mechanism including a clutch wheel coöperating with the pin-wheel, a clutch on the clutch wheel adapted to engage a pin on the pin-wheel and rotate the pin-wheel with the clutch-wheel, means tending to force the clutch ahead of the pin, and means for releasing the clutch from the pin and permitting it to pass the pin as the fare register is thrown out of operation and for returning it in the path of the pin as the register is thrown into operation.

19. In a fare register for vehicles, registering mechanism, actuating mechanism for the registering mechanism, including a pin-wheel having a plurality of pins thereon, driving mechanism for the actuating mechanism including a clutch-wheel coöperating with the pin-wheel, a clutch on the clutch-wheel adapted to engage one of the pins on the pin-wheel and rotate the pin-wheel with the clutch-wheel and tending to pass ahead of the pin with which it is in engagement, and means for releasing the clutch from and permitting it to pass such pin as the fare register is thrown out of operation and for returning it in the path of the next pin as the register is thrown into operation, whereby the driving mechanism runs idly until the next pin is engaged.

20. In a fare register for vehicles, the combination of an indicating register primarily set to indicate a minimum fare, actuating mechanism for the indicating register, driving mechanism for the actuating mechanism, means for allowing the driving mechanism to run idly during a predetermined distance, and means for deferring the registration of the indicating register until after a predetermined action of the actuating mechanism.

21. In a fare register for vehicles, a fare-indicating register primarily set to indicate a minimum fare, a total fare units indicating register, actuating mechanism for the indicating registers, driving mechanism for the actuating mechanism, means for allowing the driving mechanism to run idly during a predetermined distance, and means for deferring the registration of the indicating registers until after a predetermined action of the actuating mechanism.

22. In a fare register for vehicles, a fare-indicating register primarily set to indicate a minimum fare, equivalent to two units of distance, a total fare units indicating register, actuating mechanism for the indicating registers, driving mechanism for the actuating mechanism, means for allowing the driving mechanism to run idly during the first half of a unit of distance, and means for deferring the registration of the indicating registers until after one unit actuation of the actuating mechanism.

23. In a fare register for vehicles, the combination of a fare-indicating register primarily set to indicate a minimum fare, a total-fare units register, actuating mechanism for the two registers adapted to simultaneously actuate both registers, driving mechanism for the actuating mechanism, means for deferring the registration of the fare-indicating register until a predetermined action of its actuating mechanism, and means for allowing the driving mechanism to run idly during a predetermined distance.

24. In a fare register for vehicles, the combination of a fare-indicating register primarily set to indicate a minimum fare, a total-fare units register, actuating mechanism for the two registers adapted to simultaneously actuate both registers, driving mechanism for the actuating mechanism, means for allowing the driving mechanism to run idly during a predetermined distance, and means for deferring the registration of the two registers until after a predetermined action of the actuating mechanism.

25. In a fare register for vehicles, in combination with a sign shaft, a bodily movable shaft and driving mechanism mounted thereon, a registering device adapted to be reset, transmitting mechanism for operatively connecting the registering device to the driving mechanism, means operated by the rotation of the sign shaft for moving the movable shaft to throw the driving mechanism into and out of operative connection with the transmitting mechanism, and means operated by the rotation of the sign shaft for resetting the registering device when the sign shaft is rotated to throw the driving mechanism into operative connection with the transmitting mechanism.

26. A fare register for vehicles, in combination with a sign shaft, registering devices for indicating extras, manually operated means for setting the registering devices, means actuated by the rotation of the sign shaft for resetting the registering devices, and an auxiliary self-resetting impulse device coöperating with the resisting means and adapted to become operative near the end of the resetting operation.

27. In a fare register for vehicles, in combination with a sign shaft, registering mechanism, an actuating wheel for actuating the registering mechanism, transmitting means operatively connected to the actuating wheel, a bodily movable shaft, clock mechanism and vehicle driven mechanism differentially connected to drive the transmitting means according to the relative speed of the two mechanisms, the vehicle driven mechanism being mounted on the bodily movable shaft, and means operated by the rotation of the sign shaft for simultaneously shifting the bodily movable shaft to throw the vehicle-driven mechanism in and out of operative relation with the transmitting means and for releasing and locking the clock mechanism.

28. In a fare register for vehicles, in combination with a sign shaft, registering mechanism for indicating, respectively, the fare and extras, means actuated by the rotation of the sign shaft for simultaneously resetting both mechanisms, and an auxiliary self-resetting impulse device coöperating with the resetting means and adapted to become operative near the end of the resetting operation.

29. In a fare register for vehicles, in combination with a sign shaft, means operated by the rotation of the sign shaft for throwing the fare register into and out of operation, registering mechanism including a number-wheel shaft and number-wheels mounted thereon, actuating mechanism for the registering mechanism, clock mechanism for driving the actuating mechanism, a releasing lever operated by the rotation of the sign shaft for releasing and locking the clock mechanism, and means for rotating the number-wheel shaft and resetting the number-wheel operated by the rotation of the sign shaft when the sign shaft is rotated to throw the fare register into operation.

30. In a fare register for vehicles, in combination with a sign shaft, registering mechanism including a shaft and a series of number-wheels loosely mounted on the shaft, means actuated by the rotation of the sign shaft for rotating the shaft to reset the number-wheels, engaging means on the number-wheels for engaging the shaft as the shaft is rotated, and means coöperating with the shaft and adapted to give to the shaft an additional final impulse in a forward direction to bring the number-wheels positively into proper position.

31. In a fare register for vehicles, in combination with a sign shaft, registering mechanism including a slotted shaft and a series of number-wheels loosely mounted on the shaft, means actuated by the rotation of the sign shaft for rotating the shaft to reset the number-wheels, a pawl on each number-wheel adapted to engage in the slot in the shaft as the shaft is rotated, a cam member on the shaft, and a spring-pressed lever adapted to coöperate with the cam to give to the shaft an additional final impulse in a forward direction to bring the number-wheels positively into proper position.

32. In a fare register for vehicles, in combination with a sign shaft, a registering device including a number-wheel shaft and number-wheels mounted thereon, engaging means between the number-wheels and number-wheel shaft arranged to permit the number-wheels to rotate freely in one direction relative to their shaft and to permit the number-wheels to rotate in the opposite direction relative to their shaft only until reset to their initial position, vehicle-operated means for rotating the number-wheels in their free direction on their shaft.

33. In a fare register for vehicles, in combination with a sign shaft, a registering device including a number-wheel shaft and number-wheels mounted thereon, the number-wheel shaft being provided with a longitudinal slot, pawls suitably disposed on the number-wheels and arranged to ride over the slot when the number-wheels are rotated in one direction relative to their shaft and to take into the slot and reset the number-wheels when the number-wheels are rotated in the opposite direction relative to their shaft, vehicle-operated means for rotating the number-wheels on their shaft in their free direction, and a train of gear wheels operatively connecting the sign shaft and number-wheel shaft and arranged to rotate the number-wheel shaft and reset the number-wheels when the sign shaft is rotated.

In testimony whereof I have affixed my signature in presence of two witnesses.

BERNHARD VOLKMAR.

Witnesses:
 HENRY D. WILLIAMS,
 BERNARD COWEN.